US006651593B2

(12) United States Patent
Fornes

(10) Patent No.: US 6,651,593 B2
(45) Date of Patent: Nov. 25, 2003

(54) HEAD GATE ELEMENT WITH LOCKING OF THE MOVABLE BAR BY MEANS OF A SLIDE

(76) Inventor: José Fornes, 32 rue de Richelieu, 86200 Loudun (FR)

( * ) Notice: Subject to any disclaimer, the term of this patent is extended or adjusted under 35 U.S.C. 154(b) by 0 days.

(21) Appl. No.: 10/123,054

(22) Filed: Apr. 12, 2002

(65) Prior Publication Data

US 2003/0000043 A1 Jan. 2, 2003

(30) Foreign Application Priority Data

May 2, 2001 (FR) .............................................. 01 05875

(51) Int. Cl.[7] .............................................. A01K 15/04
(52) U.S. Cl. ...................................... 119/750; 119/741
(58) Field of Search ................................ 119/741, 739, 119/746, 750

(56) References Cited

U.S. PATENT DOCUMENTS

| 1,072,352 A | * | 9/1913 | Neller | 119/741 |
| 5,373,813 A | * | 12/1994 | Da Silveira | 119/750 |
| 5,564,368 A | * | 10/1996 | Hepp et al. | 119/741 |
| 5,694,887 A | * | 12/1997 | Vandenberg | 119/750 |
| 5,878,697 A | * | 3/1999 | Hatfield | 119/739 |

* cited by examiner

Primary Examiner—Charles T. Jordan
Assistant Examiner—Elizabeth Shaw
(74) Attorney, Agent, or Firm—Nawrocki, Rooney & Sivertson, P.A.

(57) ABSTRACT

The head gate element comprises a frame (1), a control bar (13), a movable bar (10) able to take three positions and receiving a locking fork joint (11) carrying a slide (15) guided in translation by means situated on the internal face of each of the plates (11a, 11b) of the fork joint (11).

19 Claims, 5 Drawing Sheets

ART ANTERIEUR

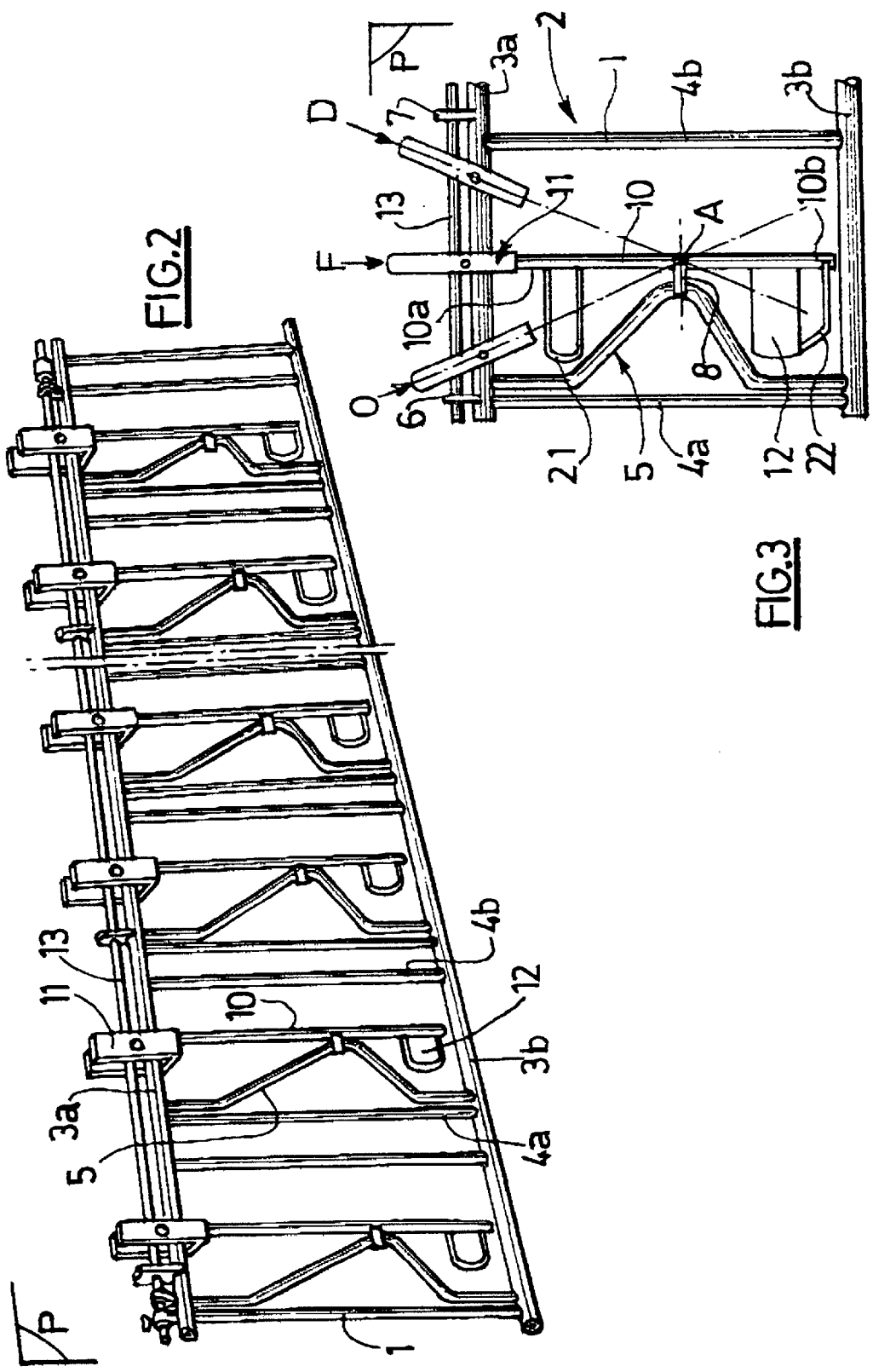

HEAD GATE ELEMENT WITH LOCKING OF THE MOVABLE BAR BY MEANS OF A SLIDE

The invention relates to a head gate of the type comprising at least one tubular structural element and extending in a main plane.

The head gate is a special gate constituting a barrier making it possible to hold farm animals in position, limiting their movements by holding their neck between two parallel vertical bars.

Each structural element comprises a frame in which a substantially rectilinear movable bar is mounted so as to pivot, substantially half-way along its length, about an axis perpendicular to the main plane.

This movable bar can consequently adopt three positions:
- an open position providing a space between substantially the top half of the movable bar and the frame, thus enabling the animal to pass its head through the head gate element;
- a closed position in which the movable bar is substantially vertical and parallel to an element of the frame, preventing the animal from withdrawing its head is from the head gate element;
- a release position providing a space between substantially the bottom half of the movable bar and the frame, thus enabling the animal, for example in the event of falling, to withdraw its head from the head gate element through the bottom.

Each head gate element makes it possible to accept one animal, the head gate being formed by the assembly, in the same plane, of as many elements as there are animals.

In the prior art, the head gate elements comprise means of locking the aforementioned movable bar.

By way of example and as described in the patent FR 2 750 292 of the present applicant, FIG. 1 is a partial view of a head gate element showing one of these devices for locking the movable bar.

These locking means usually comprise a hollow control bar 113 mounted on a top part 103 of the frame 101 and a locking fork joint 111 fixed at the top end 110a of the movable bar 110. The locking fork joint 111 coming to straddle the control bar 113.

The control bar 113 is able to move in rotation about its longitudinal axis and has, over its length, projections 121, 122, 123 intended to cooperate with a slide 115 carried by the locking fork joint 111.

The locking fork joint 111 comprises two substantially parallel walls 111a, 111b, extending in the longitudinal direction of the movable bar 110, in which facing oblong holes 130a, 130b are formed, also extending in the longitudinal direction of the movable bar 110.

The slide 115, extending between the walls 111a, 111b of the locking fork joint 111 and being guided in translation in the oblong holes 130a, 130b, cooperates under the effect of its own weight with the projections 121, 122, 123 on the control bar 113 in order to lock the movable bar 110 in its closed position.

The head gate described in the document FR 2 750 292 does not give complete satisfaction.

This is because, the slide 115 being guided in translation by the two oblong holes 130a, 130b, it is necessary for the fixings 131a, 131b to be projecting from the external faces of the locking fork joint 111 in order to effect the guidance.

It is possible to limit the size of these projecting parts 131a, 131b but not to omit them since they are made obligatory by the use of opening-out oblong holes 130a, 130b as guides for the translation movement of the slide 115.

These projecting parts 131a, 131b make it possible to lift the slide 115 from the external faces of the locking fork joint 111 giving the possibility for the animal in place in the head gate to lift the slide 115 with its muzzle and thus to put the head gate element in the open position in order to release itself.

In addition, the document EP-A-1 040 753 describes a head gate comprising a control bar having notches intended to receive a sliding shaft, thus enabling the movable bar to be locked. In this document also, the sliding shaft has parts projecting from the external faces of the blocking fork joint.

The aim of the invention is to mitigate these drawbacks of the prior art by providing a head gate element provided with a device for locking the movable bar which is more secure and less expensive to manufacture.

The invention also aims to provide a precise translational movement of the slide by preventing unwanted releases.

To this end, the object of the invention is a head gate element comprising:
- a substantially flat frame;
- a substantially rectilinear movable bar mounted so as to pivot on a shaft fixed to the said frame and substantially perpendicular to the plane, so that the movable bar can be situated in two extreme inclined positions, namely an open position and a release position, as well as in an intermediate so-called closed position in which the movable bar is substantially vertical;
- fixed rigidly to one end of the movable bar, a locking fork joint formed by two plates, receiving a transverse slide able to move in translation in the direction of the movable bar;
- a control bar able to move in rotation about its longitudinal axis in order to control the possibilities of the movable bar in the aforementioned three positions, this control bar being fixed in translation to the top part of the frame and extending between the two plates of the locking fork joint.

According to a general definition of the invention, the control bar comprises locking means arranged to cooperate with the slide of the locking fork joint, the slide being guided in translation by guidance means situated on the internal face of each of the plates.

The external faces of the locking fork joint are thus free of any projecting translation device, preventing the possibility of the animals lifting the slide.

In one embodiment, the guidance means comprise profiled sections situated on the internal face of each of the plates, the said profiled sections having their longitudinal axis substantially parallel to the longitudinal axis of the movable bar.

The use of these profiled sections makes it possible to obtain robust runners at a low production cost.

More precisely, two profiled sections are fixed to the internal face of each of the plates, the two profiled sections of one and the same plate being separated from each other so that the slide can slide along this distance.

This type of guidance has sufficient precision for the application in question.

It can however be improved by providing, on the slide, stops arranged so as to slide against the profiled sections whilst preventing the slide from coming into contact with the two plates, thus preventing its wedging during its translation movement.

In a particular embodiment, the slide comprises a metallic core and a polymer is envelope.

The metallic core enables the slide to attain a weight providing good functioning of the locking means and the polymer envelope makes it possible to obtain a covering with a low coefficient of friction in which it is also possible to form the stops described above.

The measures described up to now allow optimum guidance of the slide and secure locking of the movable bar.

It is also possible to propose a control bar with no welds and providing better locking of the slide.

To this end, a head gate element is provided of the type described above in which the locking means carried by the control bar comprise a transverse notch arranged so that the slide can fit therein when the movable bar and the control bar are in the closed position.

According to one possible embodiment, the control bar is solid and produced from a material belonging to the group formed by aluminium and its alloys.

The bar can be produced from a strong lightweight metallic material, other than galvanised steel, made from copper or bronze. The bar can also comprise a metallic core and a covering made of plastics material.

The result is firstly the possibility of manufacturing the control bar from a solid profiled section in which a transverse groove will be machined in order to form the said notch.

It is no longer necessary to carry out welding, the control bar thereby being more simple and less expensive to manufacture.

The slide can cooperate either with a control bar provided with a notch or welded projections, and can be adapted to existing head gates.

According to one embodiment, the locking means carried by the control bar also comprise an inclined flat on the control bar so as to form a slope, the bottom of the said slope opening out in the notch and the top of the said slope being oriented towards the open position of the movable bar so that the slide, when the movable bar passes from the open position to the closed position, can slide along the control bar and then along the slope and then fit in the notch.

This slope facilitates the locking of the movable bar by obliging the slide to fit in the notch.

This is because, when the movable bar is actuated and the slide is at the bottom of the slope, the said slide is then already partially engaged in the notch and, coming to abut against the side of the notch opposite to the flat, can only fit in.

In one embodiment, the head gate element also comprises a safety locking device for the closed position of the movable bar, the said device consisting of a removable pin connecting, when it is in place. The locking fork joint and the frame.

The various embodiments can also advantageously encompass safety equipment vis-a-vis the animals.

In particular, the movable bar of the head gate element according to the invention can also comprise, towards its end part opposite to the locking fork joint, means forming a counterweight able to automatically return the movable bar into its open position when it is not being acted on.

This prevents injury to or strangulation of the animals since the head gate can go into the closed position only by means of a deliberate action by the user.

In a variant, a bar connects the said end of the movable bar to the means forming a counterweight so as to prevent the collars of the animals becoming attached to the movable bar.

In another embodiment, these means forming a counterweight extend in a plane parallel to the main plane of the head gate so that they also enable the passage between the bottom part of the movable bar and the frame to be blocked off, on the side which is not provided for the animal to insert his head therein.

Likewise, the movable bar can also comprise, close to the locking fork joint, means of blocking the passage between the top part of the movable bar and the frame, also on the side which is not provided for the animal to insert its head therein.

By thus blocking the openings not designed for the passage of the head of the animal, risks of jamming are greatly reduced.

In another embodiment, means of controlling the rotation of the control bar are provided.

As a variant, it is also possible to provide an end of rotational travel member, as well as means of locking the control bar for angular position.

Other particularities and advantages of the invention will also emerge from the following description relating to the accompanying drawings, given by way of non-limiting examples:

FIG. 2 is a perspective view of a head gate composed of several head gate elements according to the invention;

FIG. 3 is a front view of a head gate element according to one embodiment of the invention;

Figure 1:
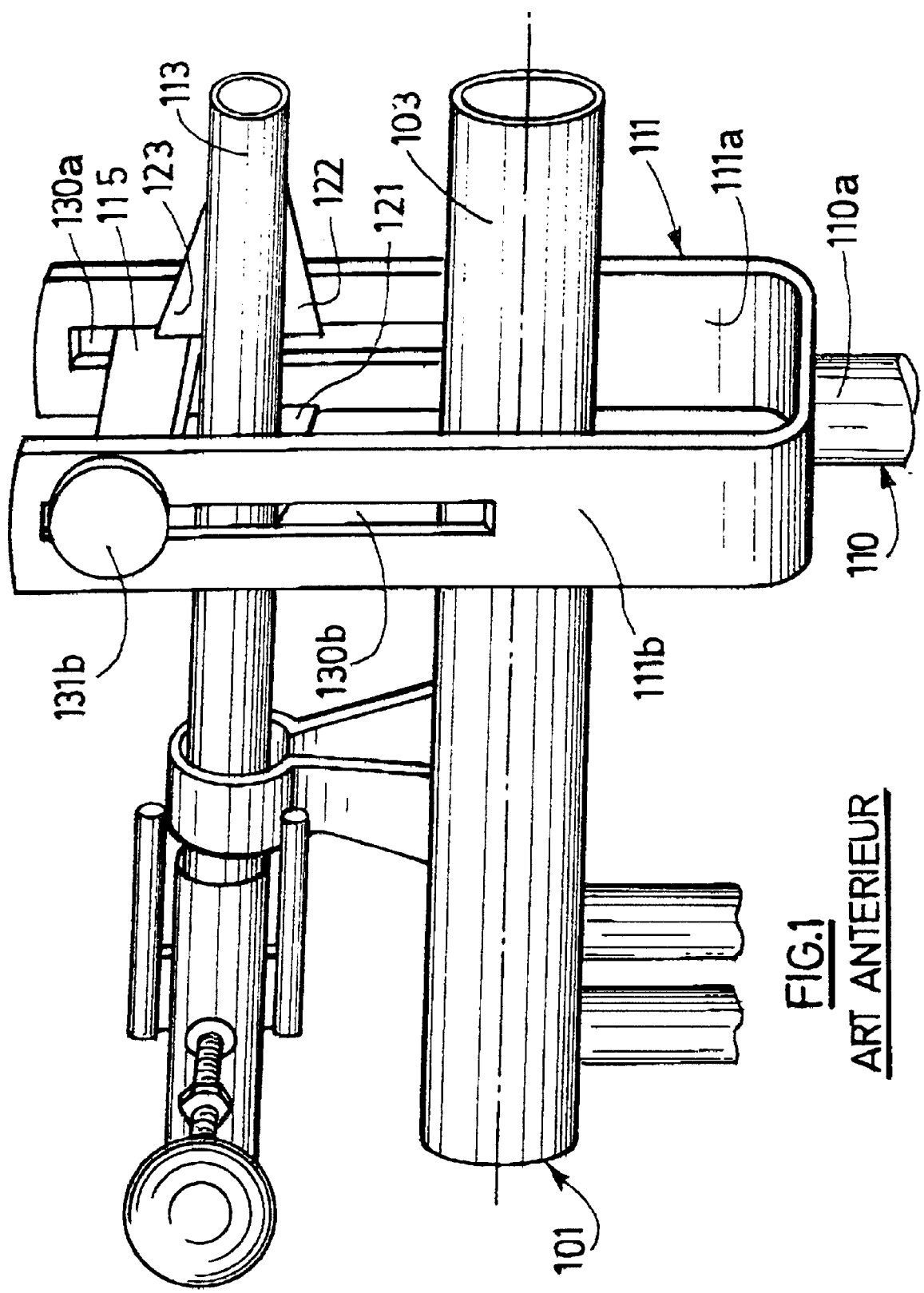
FIG. 1 is a partial view of a head gate element of the prior art described previously.

As depicted in FIG. 2, the frame 1 of the head gate element 2 comprises two substantially parallel longitudinal members 3*a*, 3*b* and two cross-members 4*a*, 4*b* substantially perpendicular to the longitudinal members 3*a*, 3*b* and connecting them together rigidly, the longitudinal members and cross-members lying in the same plane P.

The longitudinal members 3*a*, 3*b* and the cross-members 4*a*, 4*b* are hollow tubes, generally produced from steel, and galvanised.

An angled bar 5 is rigidly fixed to the frame 1, between the cross-members 4*a*, 4*b* and close to one of these cross-members 4*a*, the apex of the angle being oriented towards the other cross-member 4*b* and receiving a fork joint 8 intended to provide a pivot connection with the movable bar 10 on a pivot axis A substantially perpendicular to the plane P.

A control bar 13 is mounted on two bearings 6, 7 fixed to the top longitudinal member 3*a* so as to be substantially parallel to the said longitudinal member 3*a* and so as to be able to move in rotation on its own longitudinal axis. The bearings 6, 7 prevent the upward movement of the control bar 13, in particular caused by the animals, thus preventing accidents.

The control bar 13 is solid and produced from a strong lightweight material which does not require to be galvanised.

For example, the control bar 13 is produced from aluminium. In order to obtain a strength and weight comparable to those of a hollow steel bar traditionally used, it is possible to choose an aluminium control bar with the same diameter as the steel bar previously used. The diameter of the control bar is less than the diameter of the longitudinal member 3a.

Thus it is possible to mount a solid aluminium control bar 13 on existing head gates, provided with a hollow steel control bar, without it being necessary to change the bearings 6, 7.

The aluminium bar does not require any additional operation such as galvanising or painting, and can be directly fitted on a head gate. Its weight is around 14 kg, as opposed to a weight of 12 kg for a hollow steel bar.

Figure 4:
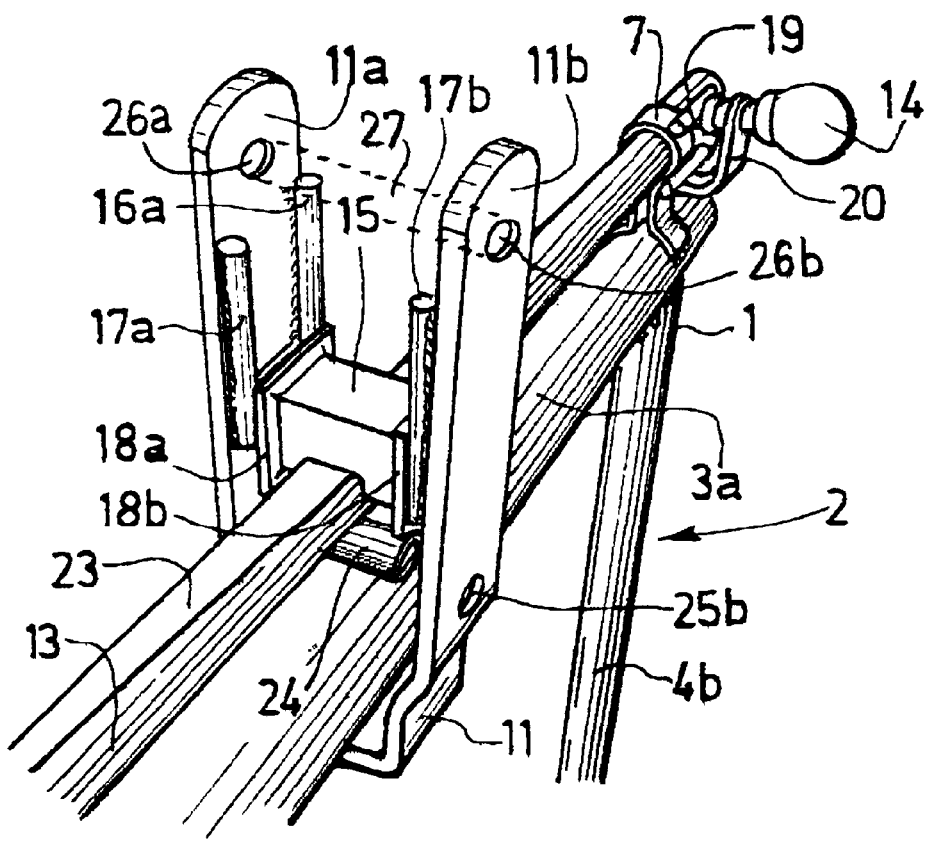
FIG. 4 is a partial perspective view of the top part of a head gate element according to one embodiment of the invention, the movable bar being in the closed position.

As shown in FIGS. 2 to 4, a locking fork joint 11 is rigidly fixed to the movable bar 10, at its end 10a close to the control bar 13, the said fork joint 11 comprising two substantially parallel plates 11a, 11b extending in the longitudinal direction of the movable bar 10 and arranged so as to straddle the top longitudinal member 3a and the control bar 13.

FIG. 4 shows that means 16a, 17a, 16b, 17b of guiding in translation are situated on the internal face of each of the plates 11a, 11b.

This is because, on the internal face of each of the plates 11a, 11b, there are welded side by side two profiles 16a, 17a; 16b, 17b, for example cylindrical and parallel, extending on axes substantially parallel to the longitudinal direction of the movable bar 10.

A slide 15 is arranged so as to be inserted in the locking fork joint 11, between the two plates 11a, 11b and, at each plate, between each pair of cylindrical profiles 16a, 17a; 16b, 17b.

Figure 7:
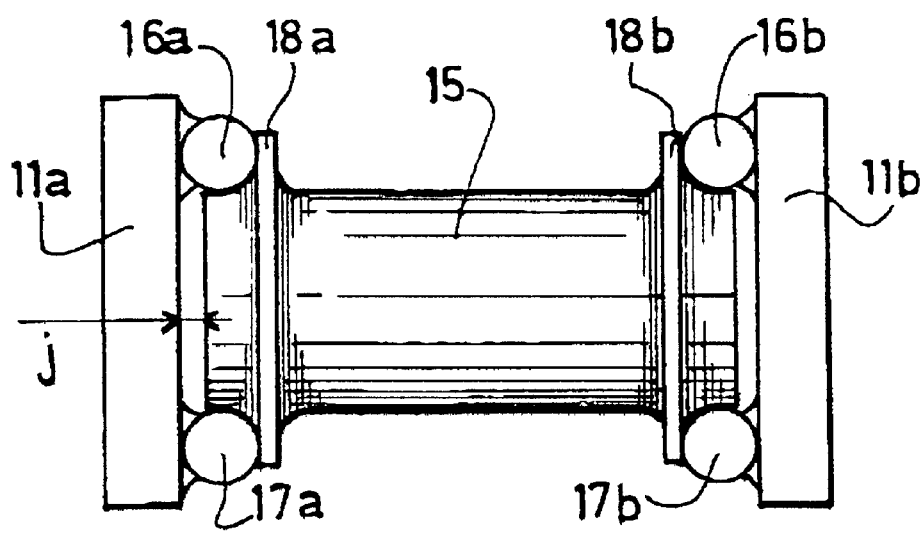
FIG. 7 is a plan view of the movable bar, in the direction of the longitudinal axis of the said bar.

On each internal face of the plates 11a, 11b, the separation between the two profiles 16a, 17a; 16b, 17b enables the slide 15 to slide along this separation distance, as can be seen in FIG. 7.

The slide 15 is described in more detail with reference to FIGS. 7 to 9.

The slide 15 comprises a metallic core 30 and a hollow polymer envelope 31 intended to receive the said core 30. This structure in two parts produced from different materials makes it possible to be free of thermal constraints and to use the slide 15 at very different temperatures. The slide 15 also comprises a closure element 32.

The metallic core 30 confers on the slide 15 sufficient weight to ensure that it drops between the plates 11a, 11b and allows locking of the movable bar 10 in the closed position, as will be seen below. The metallic core 30 is for example substantially parallelepipedal, this shape, adapted to the internal shape of the envelope 31, making it possible to obtain better locking of the movable bar 10.

The envelope 31 is produced from a polymer with a low coefficient of friction, in order to ensure good sliding of the slide 15 along the profiles 16a, 17a; 16b, 17b.

The envelope 31 comprises a hollow parallelepipedal central part 33 provided on its internal face 34 with projections 35 extending longitudinally. The projections 35 reinforce the slide 15 but also limit stresses due to temperature.

The envelope 31 also comprises, towards its end parts, flat walls forming stops 18a, 18b.

Figure 8:
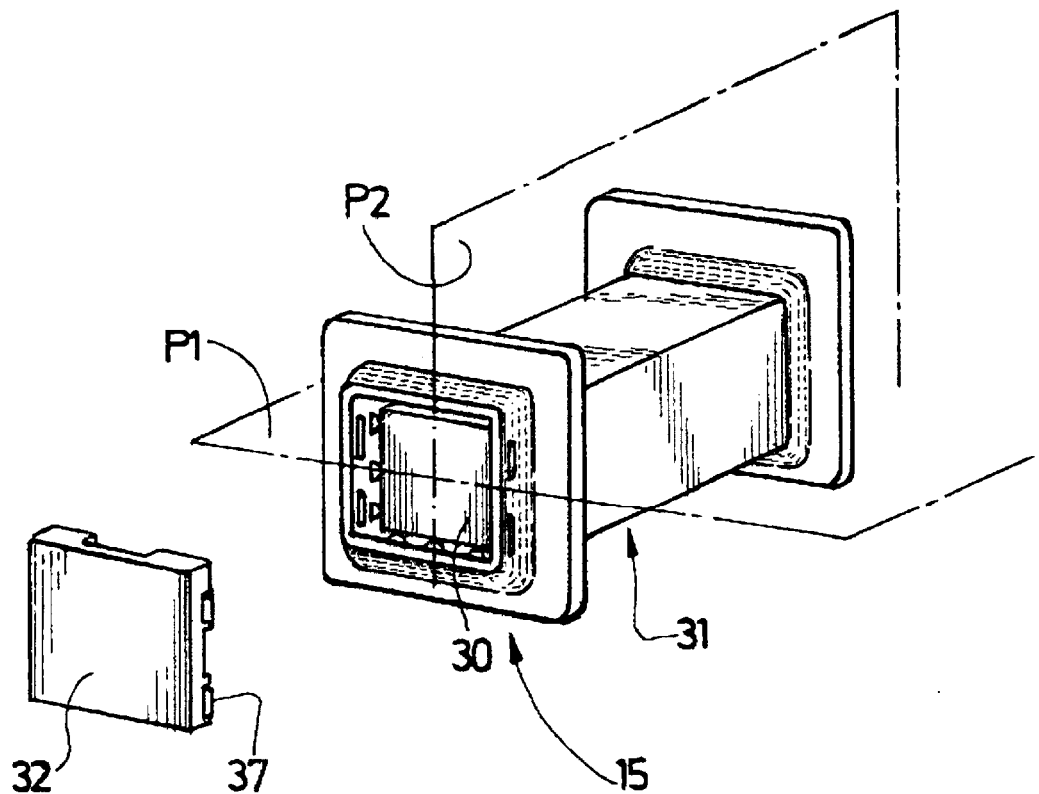
FIG. 8 is a perspective view of an embodiment of the slide, comprising a metallic core and an envelope, as well as a closure element which has been removed.
Figure 9:
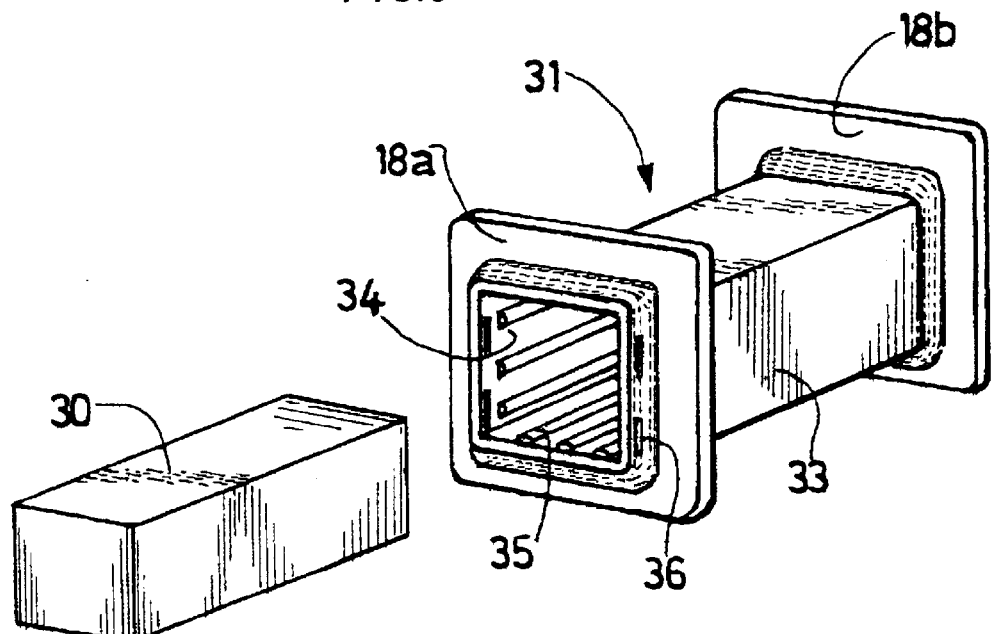
FIG. 9 is a view similar to that of FIG. 8, the metallic core being separated from the envelope of the slide, the closure element not being shown.

The slide 15 has two longitudinal planes of symmetry P1, P2, substantially perpendicular to each other, as illustrated in FIG. 8.

Finally, the envelope 31 comprises at one of its ends orifices 36 intended for fixing the closure element 32, which has complementary lugs 37. One possible implementation of the slide 15 consists of introducing the metallic core 30 into the envelope 31 and then associating the closure element 32 with the said envelope 31 by snapping on.

The stops 18a, 18b are arranged to slide against the cylindrical profiles 16a, 17a, 16b, 17b whilst preventing the slide 15 from coming into contact with the two plates 11a, 11b, thus preventing its wedging during its translation movement. A clearance j is thus provided between each end of the slide 15 and the internal face of the plates 11a, 11b, as shown in FIG. 7.

On the control bar 13, substantially at its middle, there is machined a notch 19 having a shape enabling the slide 15 to fit therein—for example a substantially parallelepipedal shape. The notch 9 is for example produced by means of a press, the control bar 15 being thus pressed in one very simple and rapid operation. The tool forming the notch is moved perpendicular to the control bar 13, substantially parallel to the bottom of the notch 9.

In the open position O, the slide 15 rests through the effect of its own weight, on the control bar 13.

Thus, when the movable bar 10 passes from the open position O to the closed position F, the user can manually actuate the said movable bar 10, the slide 15 sliding along the control bar 13 until it encounters the notch 9 and fits therein. The passage from the open position O to the closed position F can also take place without the intervention of the user, by simple movement of the animals moving their head downwards in order to feed from a receptacle placed at the foot of the head gate for this purpose.

The position of the notch 9 on the length of the control bar 13 therefore determines the closed position F.

Although the control bar 13 does not have sharp edges at the notch 9, the repetition of the pivoting movement of the movable bar, and the contact between the slide 15 and the notch 9, results in wear on the envelope 31 of the slide 15. The metallic core 30 may then be visible and generate a large amount of noise when it slides on the control bar 13.

The existence of the two planes of symmetry P1, P2 also considerably increases the service life of the slide 15 since the slide 15 can be turned on itself, about its longitudinal axis, by quarters of a turn, so as to turn towards the control bar 13 a non-worn face of the central part 33 of the envelope 31 of the slide 15, and this without modifying the functioning of the head gate.

The fact that the control bar 13 is able to move in rotation on its longitudinal axis enables it to adopt at least two angular positions; a first angular position (see FIGS. 3 and 4) in which the notch 9 is turned towards the slide 15 when the latter is closed, thus enabling it to fit in, and a second angular position (see FIG. 5) in which the notch 9 is retracted from the path of the slide 9 on the control bar 13, the movable bar 10 thus being able to be moved between the open position O and the release position D without being locked.

Means of controlling in rotation, for example a handle 14 fixed to the control bar 13, enables the user to place the said bar in the required angular position. Nevertheless, an end of rotational travel member 19 limits the rotation of the control bar to the required angular sector.

Means 20 of locking the angular position of the control bar 13 are also provided.

Moreover, the rotation of the control bar 13 enables the movable bar 10 to be released when the latter is in the closed position F with the slide 15 fined in the notch.

This is because, when the control bar 13 is rotated and passes from the first angular position to the second angular position, the notch 9 is released from the slide 15.

In addition, the invention provides means for preventing the upward translational movement of the slide 15, outside the plates 11a, 11b. This can in particular occur when animals cause impacts in the head gate. These means, illustrated in FIG. 4, comprise orifices 26a, 26b formed in the plates 11a, 11b, towards their top end, and a hollow cylindrical strut 27 (shown in dotted lines) intended to be placed substantially horizontally, perpendicular to the plates 11a, 11b, in correspondence with the orifices 26a, 26b. The fixing of the strut 27 to the fork joint 11 takes place by means of screws—not shown—once the slide 15 has been inserted between the cylindrical profile 16a, 17a, 16b, 17b.

FIGS. 2 and 3 show that the movable bar 10 also comprises, towards its end part 10b opposite to the locking fork joint, means 12 forming a counterweight able to automatically return to the movable bar 10 into its open position C when it is not being acted on.

These means forming a counterweight can be a metal sheet 12 welded to the bottom part of the movable bar 10 and extending in a plane parallel to the plane P, in the direction of the angled bar 5, in order to block the passage between the bottom part of the movable bar 10 and the cross-member 4a situated on the angled bar 5 side.

The purpose of the blocking of this passage is to prevent the animal from putting his head therein, thus preventing injury.

Likewise, also visible in FIG. 3, the movable bar 10 also comprises, towards its top part 10a, close to the locking fork joint 11, means 21 of blocking the passage between the movable bar 10 and the cross-member 4a situated on the angled bar 5 side.

The animals must also be protected against their collars being hooked on the bottom end 10b of the movable bar 10. For this purpose, a welded bar 22 connects the said end of the movable bar 10 to the metal sheet 12 forming a counterweight (see FIG. 3).

Figure 5:
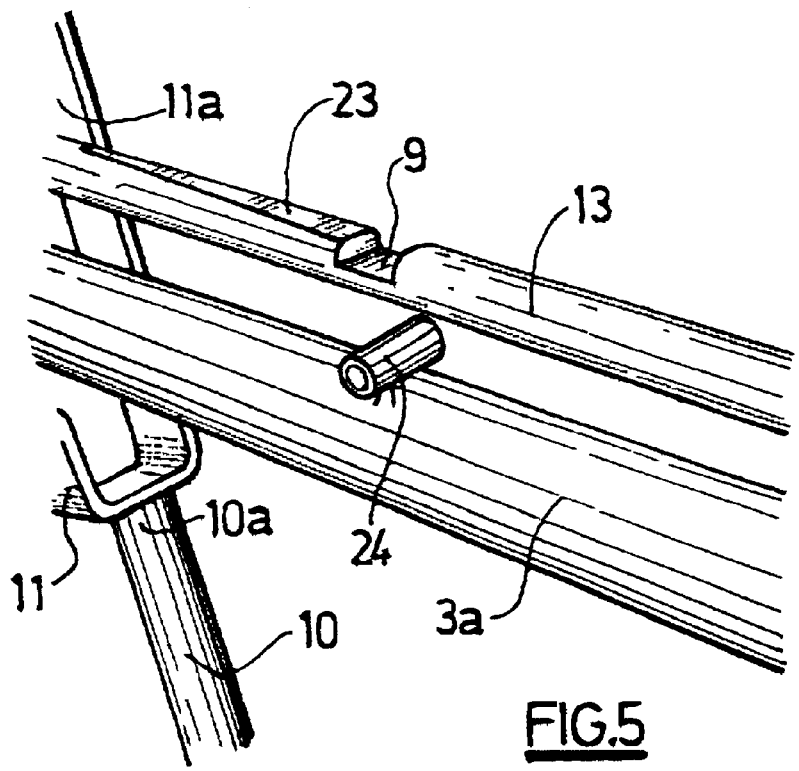
FIG. 5 is a partial perspective view of the head gate element of FIG. 4, the movable bar being in the open position.
Figure 6:
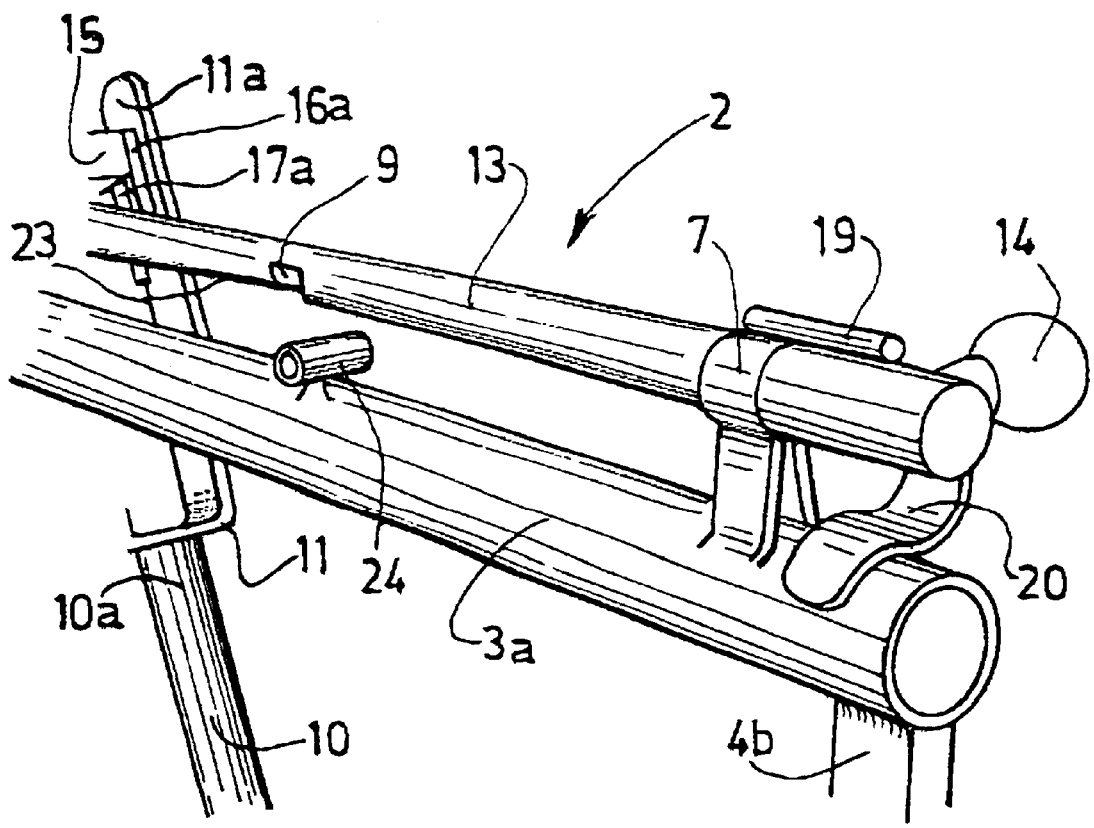
FIG. 6 is a partial perspective view of the head gate element of FIG. 4, the movable bar being in the open position and the control bar being in an angular position according to which the notch is retracted from the path of the slide.

As shown by FIGS. 4 and 5 and in order to improve the fining of the slide 15 in the notch 9, an inclined flat 23 is provided on the control bar 13 so as to form a slope, the bottom of the said slope 23 opening out in the notch 9 and the top of the said slope 23 being oriented towards the open position O of the movable bar 10 so that the slide 15, when the movable bar 10 passes from the open position O to the closed position F, slides along the control bar 13 and then along the slope 23 and then fits in the notch 9. The flat can also be produced by means of a press.

In the present embodiment and following tests, the following values were adopted in order to ensure correct functioning of the locking of the movable bar 10:

distance between the two internal faces of the plates 11a, 11b: 80 mm
  length of slide 15: 74 mm
  space between the cylindrical profiles 16a, 17a; 16b, 17b on one and the same internal face of the plates 11a, 11b: 31 mm
  width of the slide 15: 30 mm
  weight of the slide 15: 300 g to 350 g
  diameter of the control bar 13: 28 mm
  width of the notch 9 (in the longitudinal direction of the control bar 13): 30.5 mm
  depth of the notch 9 (in the radial direction of the control bar 13): 14 mm (the bar 13 is machined as far as its mid-diameter)
  length of the slope 23 (in the longitudinal direction of the control bar 13): 150 mm
  difference in level of the slope 23: 4 mm.

The head gate element according to the invention can also comprise a device for the safety locking of the closed position F in the movable bar 10 clearly visible in FIGS. 4 and 5, the said device comprising a removable pin (not shown) introduced into a sleeve 24 fixed to the frame 1 and in the holes 25a, 25b formed in the plates 11a, 11b, the said pin, when it is in place, connecting the locking fork joint 11 and the frame 1.

What is claimed is:

1. A head gate element comprising:
  a substantially flat frame;
  a substantially rectilinear movable bar mounted so as to pivot on a shaft fixed to said frame and substantially perpendicular to the plane, so that the movable bar can be situated in two extreme inclined positions, namely an open position and a release position, as well as in an intermediate closed position in which the movable bar is substantially vertical;
  fixed rigidly to one end of the movable bar, a locking fork joint formed by two plates, receiving a transverse slide able to move in translation in the direction of the movable bar;
  control bar able to move in rotation about its longitudinal axis in order to control the possibilities of the movable bar in the three positions, said control bar being fixed in translation to the top part of the frame and extending between the two plates of the locking fork joint;
  the control bar comprising locking means arranged to cooperate with the slide of the locking fork joint, characterized in that said slide is guided in translation by guidance means situated on the internal face of each of the plates.

2. A head gate element according to claim 1, characterised in that the slide comprises a metallic core and a polymer envelope.

3. A head gate element according to claim 2, characterised in that the core is substantially parallelepipedal.

4. A head gate element according to claim 2, characterised in that the envelope comprises a hollow parallelepipedal central part, provided on its internal face with longitudinal projections.

5. A head gate element according to claim 1, characterised in that the slide has two longitudinal planes of symmetry perpendicular to each other.

6. A head gate element according to claim 1, characterised in that the means of guiding the slide in translation comprise profiled sections situated on the internal face of each of the plates, said profiled sections having their longitudinal axis substantially parallel to the longitudinal axis of the movable bar.

7. A head gate element according to claim 6, characterised in that two profiles are fixed to the internal face of each of the plates, the two profiles on the same plate being separated so that the slide can slide along this separation distance.

8. A head gate element according to claim 6, characterised in that the slide also comprises stops arranged so as to slide against the profiles whilst preventing the slide from coming into contact with the two plates, thus preventing their being wedged during its translation movement.

9. A head gate element according to claim 1, characterised in that the locking means carried by the control bar comprise a transverse notch arranged so that the slide can fit therein when the movable bar and the control bar are in the closed position.

10. A head gate element according to claim 9, characterised in that the locking means carried by the control bar also comprise an inclined flat on the control bar so as to form a slope, the bottom of said slope opening out in the notch and the top of said slope being oriented towards the open position of the movable bar so that the slide, when the movable bar passes from the open position to the closed position, can slide along the control bar, then along the slope and then fit in the notch.

11. A head gate element according to claim 1, characterised in that the control bar is solid and produced from a material belonging to the group formed by aluminum and its alloys.

12. A head gate element according to claim 1, characterised in that it also comprises a safety locking device for the closed position of the movable bar, said device consisting of a removable pin connecting, when it is in place, the locking fork joint and the frame.

13. A head gate element according to claim 1, characterised in that the movable bar also comprises, towards its external part opposite to the locking fork joint, means forming a counterweight able to automatically return the movable bar into its open position when it is not being acted on.

14. A head gate element according to claim 13, characterised in that a bar connects the said end of the movable bar to the means forming a counterweight.

15. A head gate element according to claim 13, characterised in that the means forming a counterweight extend in a plane parallel to the plane so that they also block the passage between the bottom part of the movable bar and the frame.

16. A head gate element according to claim 1, characterised in that the movable bar also comprises, close to the locking fork joint, means of blocking the passage between the top part of the movable bar and the frame.

17. A head gate element according to claim 1, characterised in that it also comprises means of controlling the rotation of the control bar.

18. A head gate element according to claim 1, characterised in that it also comprises an end of rotational travel member for the control bar.

19. A head gate element according to claim 1, characterised in that it also comprises means for locking the angular position of the control bar.

* * * * *